(12) United States Patent
Oda et al.

(10) Patent No.: US 8,118,436 B2
(45) Date of Patent: Feb. 21, 2012

(54) PROJECTION IMAGE DISPLAY APPARATUS

(75) Inventors: Yoshiteru Oda, Hirakata (JP); Yoshiho Suzuki, Kyoto (JP)

(73) Assignee: SANYO Electric Co., Ltd., Moriguchi (JP)

( * ) Notice: Subject to any disclaimer, the term of this patent is extended or adjusted under 35 U.S.C. 154(b) by 213 days.

(21) Appl. No.: 12/687,030

(22) Filed: Jan. 13, 2010

(65) Prior Publication Data

US 2010/0177288 A1 Jul. 15, 2010

(30) Foreign Application Priority Data

Jan. 13, 2009 (JP) ................................. 2009-004570

(51) Int. Cl.
*G03B 21/14* (2006.01)
(52) U.S. Cl. .......................... 353/101; 359/823; 359/825
(58) Field of Classification Search .................. 353/100, 353/101, 119; 359/822, 823, 825
See application file for complete search history.

(56) References Cited

U.S. PATENT DOCUMENTS

| | | | | |
|---|---|---|---|---|
| 6,416,184 B1 * | 7/2002 | Arai et al. | ........................ | 353/52 |
| 7,033,028 B1 * | 4/2006 | Belliveau | ........................ | 353/31 |
| 7,204,598 B2 * | 4/2007 | Kuroda et al. | ................. | 353/101 |
| 7,246,908 B2 * | 7/2007 | Salvatori et al. | ................ | 353/69 |
| 7,354,161 B2 * | 4/2008 | Kuroda | .......................... | 353/101 |
| D605,683 S * | 12/2009 | Inoue et al. | ................... | D16/235 |
| D606,110 S * | 12/2009 | Inoue et al. | ................... | D16/230 |
| 7,635,190 B2 * | 12/2009 | Nakamura | ..................... | 353/101 |
| D614,684 S * | 4/2010 | Inoue et al. | ................... | D16/230 |
| D615,575 S * | 5/2010 | Inoue et al. | ................... | D16/230 |
| 2005/0105062 A1 * | 5/2005 | Li et al. | ......................... | 353/100 |
| 2007/0052935 A1 * | 3/2007 | Nakamura | ..................... | 353/101 |
| 2009/0185145 A1 * | 7/2009 | Kitahara et al. | ............... | 353/101 |
| 2010/0020294 A1 * | 1/2010 | Okazaki et al. | ............... | 353/101 |
| 2010/0033693 A1 * | 2/2010 | Okazaki et al. | ............... | 353/101 |
| 2010/0053573 A1 * | 3/2010 | Wen et al. | ...................... | 353/101 |
| 2010/0245785 A1 * | 9/2010 | Kamiya et al. | ................ | 353/101 |

FOREIGN PATENT DOCUMENTS

| | | |
|---|---|---|
| JP | 1313314 S | 9/2007 |
| JP | 1289596 S | 11/2009 |

\* cited by examiner

*Primary Examiner* — William C Dowling
(74) *Attorney, Agent, or Firm* — NDQ&M Watchstone LLP

(57) ABSTRACT

A projection image display apparatus has a front panel, a projection lens, a lens hood, and a lens dial. The front panel has an opening for the projection lens. The projection lens projects through the opening for the projection lens. The lens hood covers the projection lens circumferentially, and has an opening spaced from an end of the lens hood for a dial. The lens dial is provided for adjusting focusing or zooming. It is provided at a circumference of the projection lens and exposed through the opening for the dial. The apparatus can thus avoid dust or the like foreign matters otherwise entering from a top side thereof into its main body, and also protect the projection lens when the apparatus is carried and inadvertently has a projection lens unit brought into contact with a desk or the like.

3 Claims, 4 Drawing Sheets

PROJECTION IMAGE DISPLAY APPARATUS

CROSS REFERENCE TO RELATED APPLICATIONS

This application claims priority to Japanese Patent Application No. 2009-004570, filed Jan. 13, 2009, which application is incorporated herein by reference in its entirety.

BACKGROUND OF THE INVENTION

1. Field of the Invention

The present invention relates to projection image display apparatuses having a lens hood for a projection lens.

2. Description of the Related Art

Registered Design No. 1289596 discloses a projector, as shown in FIG. 6. More specifically, the projector has a projection lens 101 projecting through an opening 103 formed at a front panel 102 for the projection lens. Projection lens 101 has its circumference covered with a lens hood 104. A lens adjustment tab 105 is provided on the apparatus's main body at a top side.

When the projector configured as above is carried, and inadvertently brought into contact with a desk or the like resulting in an impact or a load given to projection lens 101, projection lens 101, surrounded by lens hood 104, can avoid directly receiving the impact or the load, and thus be protected from damage or the like.

Registered Design No. 1313314 discloses a projector, as shown in FIG. 7. More specifically, the projector has a projection lens 111 accommodated in the main body, and a lens adjustment tab 112 on the apparatus's main body at a top side.

When the projector configured as above is carried, and inadvertently brought into contact with a desk or the like resulting in an impact or a load given to projection lens 111, projection lens 111 can avoid directly receiving the impact or the load, as projection lens 111 does not project from the main body.

Registered Design Nos. 1289596 and 1313314 are, however, configured such that an opening for the lens adjustment tab is located at the top side of the projector. This helps dust or the like foreign matters to deposit and there is a large possibility that dust or the like foreign matters enter the main body of the projector.

SUMMARY OF THE INVENTION

In view of such an issue as above, the present invention contemplates a projection image display apparatus including a projection lens projecting from the main body and a lens hood surrounding the projection lens, that can prevent dust or the like foreign matters from entering from a top side into the main body and also protect the projection lens when the apparatus is carried and inadvertently has a projection lens unit brought into contact with a desk or the like.

To address the above issue, a projection image display apparatus including a projection lens projecting through an opening formed through a front panel for the projection lens, and a lens hood covering the projection lens circumferentially has the lens hood provided with an opening spaced from an end of the lens hood for a dial to expose therethrough a lens dial provided in a vicinity of an end of the projection lens and operated to adjust focusing or zooming.

Furthermore in the above configuration the opening for the dial may be formed at at least two portions of said lens hood.

Furthermore in the above configuration a dustproof member may further be provided between the opening for the projection lens and the projection lens.

The projection image display apparatus including the projection lens projecting from the main body and the lens hood surrounding the projection lens can thus prevent dust or the like foreign matters from entering from a top side into the main body and also protect the projection lens when the apparatus is carried and inadvertently has the projection lens unit brought into contact with a desk or the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention in each embodiment provides a projection image display apparatus, as will be described hereinafter with reference to FIG. 1 to FIG. 5.

It should be noted that the figures are schematic, and that specific geometries, dimensions, and ratios are different. Furthermore, some specific geometries, dimensions, and ratios are also different between the figures.

Furthermore, in the figures, identical or similar components are identically denoted and will not be described repeatedly.

First Embodiment

Figure 1:
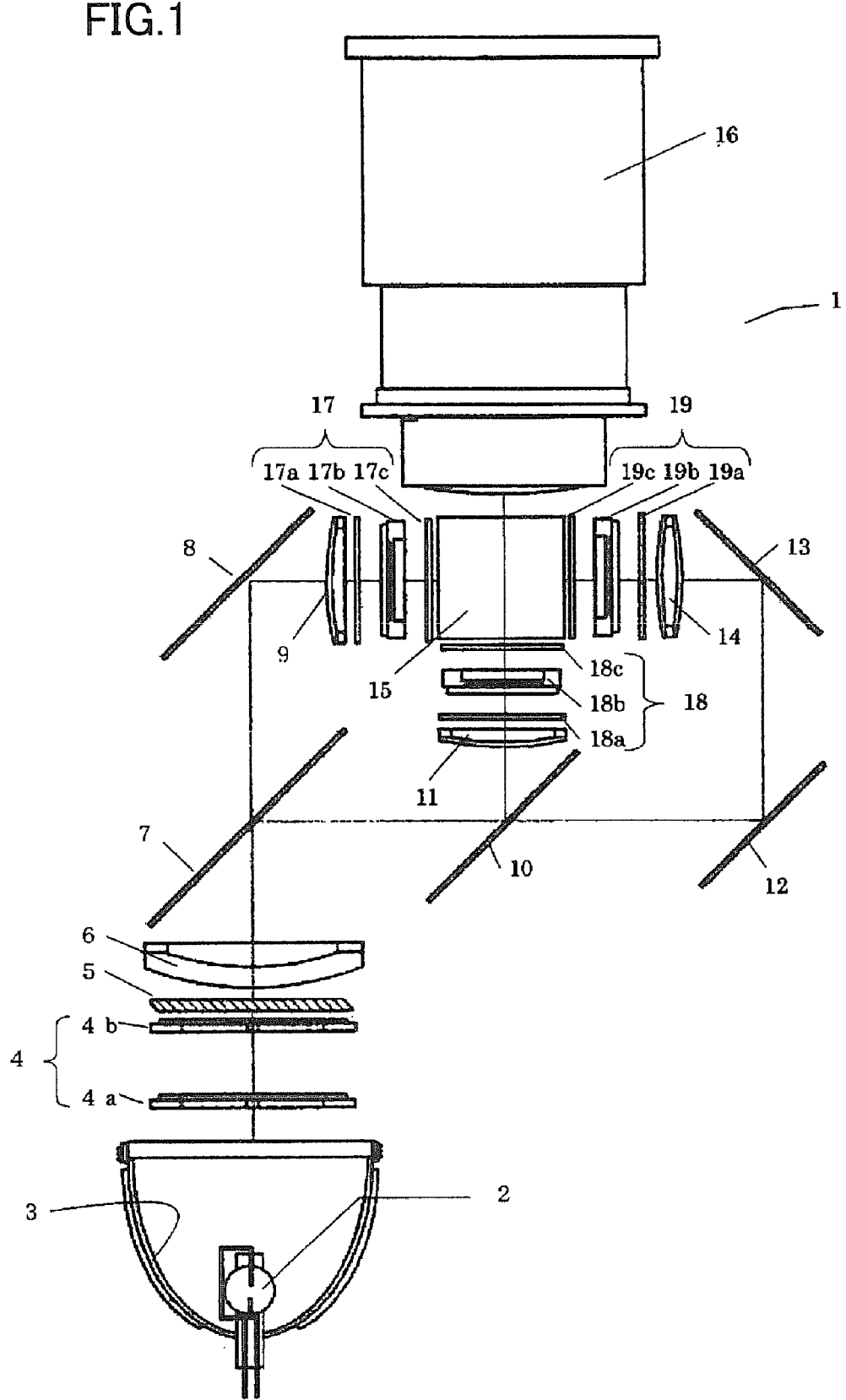
FIG. 1 shows a configuration of an optical engine of a projection image display apparatus in a first embodiment.

FIG. 1 shows a 3-plate liquid crystal optical engine 1 used in the present invention. In a light source 2 a light emitting unit is a super high pressure mercury lamp, a metal halide lamp, a xenon lamp or the like, and emits light which is in turn collimated by a parabola reflector 3 and thus emanates therefrom, and is guided to an integrator lens 4.

Integrator lens 4 is configured of a pair of lenses (fly eye lens) 4*a* and 4*b*. Each lens portion is adapted to guide the light that emanates from light source 2 to an entire surface of a liquid crystal light valve described hereinafter, to average partial, varying intensity present in light source 2 to reduce a difference in quantity of light between a center of a screen and a peripheral portion of the screen. Integrator lens 4 passes light, which in turn passes through a polarization conversion device 5 and a condenser lens 6 and is then guided to a first dichroic mirror 7.

Polarization conversion device 5 is configured of a polarizing beam splitter array (hereinafter referred to as "PBS array"). The PBS array includes a polarization separating film and a phase difference plate (a ½λ, plate). The PBS array's each polarization separating film receives light from integrator lens 4 and, of the received light, for example transmits p polarized light and redirects s polarized light to have an optical path changed by 90°. The s polarized light having its optical path changed is reflected by an adjacent polarization separating film and thus emanates. In contrast, the p polarized light transmitted through the polarization separating film is converted to s polarized light by the phase difference plate provided at a front side of the p polarized light (i.e., a side at which the light emanates), and thus emanates. In other words, in this case, almost all of light is converted to s polarized light.

First dichroic mirror 7 transmits red color wavelength band light and reflects cyan (green plus blue) wavelength band light. The red color wavelength band light transmitted by first dichroic mirror 7 is reflected by a total reflection mirror 8 and thus has its optical path changed. The red color light reflected by total reflection mirror 8 passes through a lens 9 and is transmitted through a transmission liquid crystal light valve 17 for red color light and thus optically modulated. The cyan wavelength band light reflected by first dichroic mirror 7 is guided to a second dichroic mirror 10.

Second dichroic mirror 10 transmits blue color wavelength band light and reflects green color wavelength band light. The green color wavelength band light reflected by second dichroic mirror 10 passes through a lens 11 and is guided to a transmission liquid crystal light valve 18 for green color light, and transmitted therethrough and thus optically modulated. The blue color wavelength band light transmitted by second dichroic mirror 10 is guided via total reflection mirrors 12 and 13 and a lens 14 to a transmission liquid crystal light valve 19 for blue color light, and transmitted therethrough and thus optically modulated.

Each liquid crystal light valve 17, 18, 19 is an optical modulation unit including incident polarization plates 17a, 18a, 19a, panel units 17b, 18b, 19b formed of a pair of glass substrates (provided with a pixel electrode, an orientation film and the like) and liquid crystal sealed between the glass substrates, and emanating polarization plates 17c, 18c, 19c.

The light modulated through liquid crystal light valves 17, 18, 19 (or the light of each color of an image) is composited by a cross dichroic prism 15 to be colored image light, which is in turn magnified by a projection lens 16 and thus projected, and thus displayed on a screen (not shown).

Figure 2:
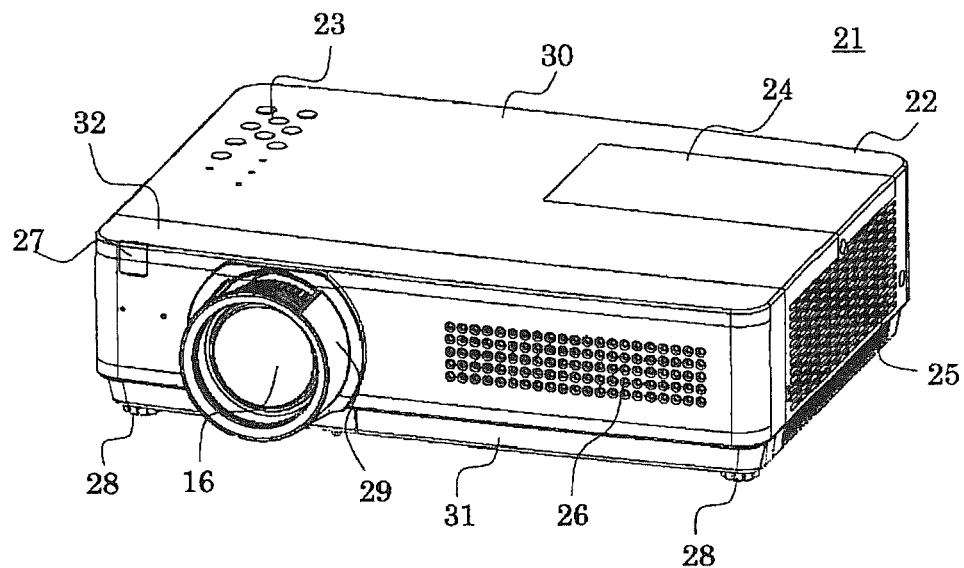
FIG. 2 is a perspective view of the projection image display apparatus in the first embodiment of the present invention.

FIG. 2 is a perspective view of a projector 21 (a projection image display apparatus) implementing a projection display apparatus having 3-plate liquid crystal optical engine 1 of the present embodiment incorporated therein.

Projector 21 has a casing 22 provided with operation buttons 23 and a light source protection cover 24 situated at a top side, an air intake port 25 and an air exhaust port 26 situated at a lateral side and a front side, a photoreceptive element 27 situated at the front side for receiving a signal from a remote controller, an adjustment leg 28 situated at a bottom side and operated to adjust the inclination of projector 21, and a lens hood 29 surrounding projection lens 16.

Casing 22 is formed of a top cover 30 covering the main body including 3-plate liquid crystal optical engine 1, a circuit board and the like (not shown), a bottom cover 31 supporting the main body, a front panel 32 covering the main body's front side, and lens hood 29 projecting from front panel 32.

Operation buttons 23 are operated by a user to power on/off projector 21, adjust a projected image in quality or perform his/her desired operation.

Light source protection cover 24 is detachably and attachably secured to top cover 30. When light source protection cover 24 is removed from casing 22, a lamp having light source 2 is exposed and thus replaceable.

Air intake port 25 introduces air into casing 22 by a fan (not shown) internal to the casing and air exhaust port 26 exhausts air externally by a fan (not shown) internal to the casing.

Photoreceptive element 27 receives an infrared signal issued from a remote controller operated by the user, as desired, and converts the optical signal to an electrical signal, which is in turn received by projector 21. Projector 21 can thus be operated similarly as done by a user operating operation buttons 23.

Adjustment leg 28 can be projected/retracted, as desired, generally perpendicularly relative to casing 22. Each adjustment leg 28 can independently be adjusted to set casing 22 at a desired angle.

Lens hood 29 is formed to surround a circumference of projection lens 16 projecting from front panel 32.

Figure 3:
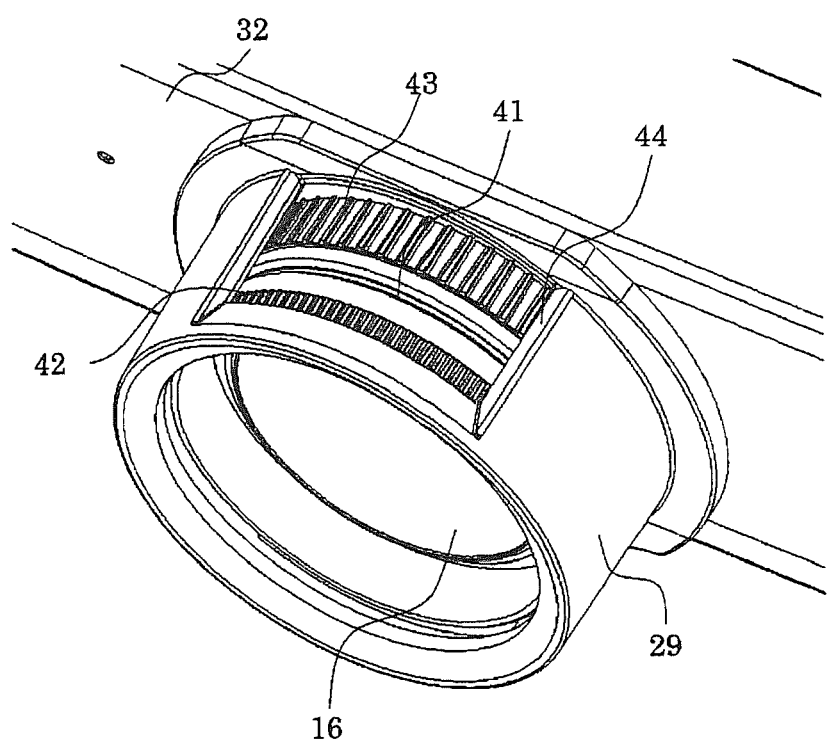
FIG. 3 is an enlarged, perspective view of a lens hood in the first embodiment of the present invention.

With reference to FIG. 3, lens hood 29 will be described more specifically. FIG. 3 is an enlarged perspective view of lens hood 29.

Lens hood 29 is formed integral with front panel 32 and projects from the front panel. Lens hood 29 has an inner diameter designed to be larger than the outermost diameter of projection lens 16 inserted in lens hood 29. Lens hood 29 has an opening 41 at an upper side for a dial. Opening 41 (a second opening) is a generally rectangular opening spaced from an end of lens hood 29 and penetrating an upper wall thereof. A focusing dial 42 or a zooming dial 43 provided for projection lens 16 is exposed through opening 41 for the dial and independently rotatable by a user through opening 41 for the dial (see FIG. 5).

Opening 41 for the dial has an outer peripheral edge 44 chamfered so that the user does not feel uncomfortable when the user operates focusing dial 42 or zooming dial 43 with his/her finger and has the finger abutting against edge 44.

Furthermore, as shown in the FIG. 3 configuration, focusing dial 42 or zooming dial 43 can be provided frontwardly of front panel 32. This can eliminate the necessity of providing casing 22 at a top side or the like with opening 41 for the dial for adjusting focusing or zooming projection lens 16. This can eliminate a possibility that dust or the like foreign matters deposited on the top side of casing 22 enter the casing from the top side.

Furthermore, as shown in the FIG. 3 configuration, lens hood 29 has an end covering the projection lens completely circumferentially. When the projector is carried, and projection lens 16 is inadvertently, directly brought into contact with a desk or the like, projection lens 16 is not damaged or can be prevented from having its position significantly displaced and its optical axis displaced.

Furthermore, lens hood 29 is formed integral with front panel 32 and is a component discrete from top cover 30 and bottom cover 31. If lens hood 29 receives a large impact or load and is thus damaged, lens hood 29 and front panel 32 can be replaced alone, which is easier than replacing lens hood 29, front panel 32, top cover 30 and bottom cover 31 all integrally, and also allows replacement components to be offered at lower costs than when lens hood 29, front panel 32, top cover 30 and bottom cover 31 are all replaced integrally.

Note that while in the first embodiment lens hood 29 is formed integral with front panel 32, it is not limited thereto, and lens hood 29 and front panel 32 may be discrete components, so that if lens hood 29 receives a large impact or load and is damaged, the lens hood can be replaced alone. This allows a replacement component to be offered at a further lower cost than when lens hood 29 and front panel 32 are both replaced.

Second Embodiment

Hereinafter the present invention in a second embodiment will be described with with reference to FIG. 4. Note that components similar to those of the first embodiment are identically denoted and will not be described repeatedly.

Figure 4:
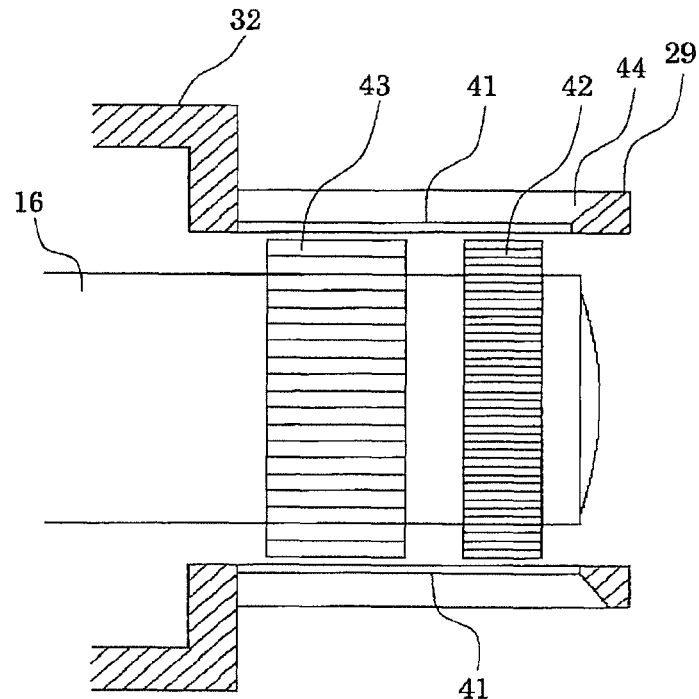
FIG. 4 is a lateral cross section of a lens hood in a second embodiment of the present invention.

FIG. 4 is a lateral cross section of lens hood 29 of projector 21, as shown at a lateral side. In the first embodiment, opening 41 for the dial is formed at lens hood 29 through a top side at a single location, whereas in the second embodiment, it is formed at lens hood 29 through a top side and a bottom side.

This allows focusing dial 42 or zooming dial 43 to be held with fingers vertically and thus rotated further smoothly.

Third Embodiment

Hereinafter the present invention in a third embodiment will be described with reference to FIG. 5. Note that components similar to those of the first or second embodiment are identically denoted and will not be described repeatedly.

Figure 5:
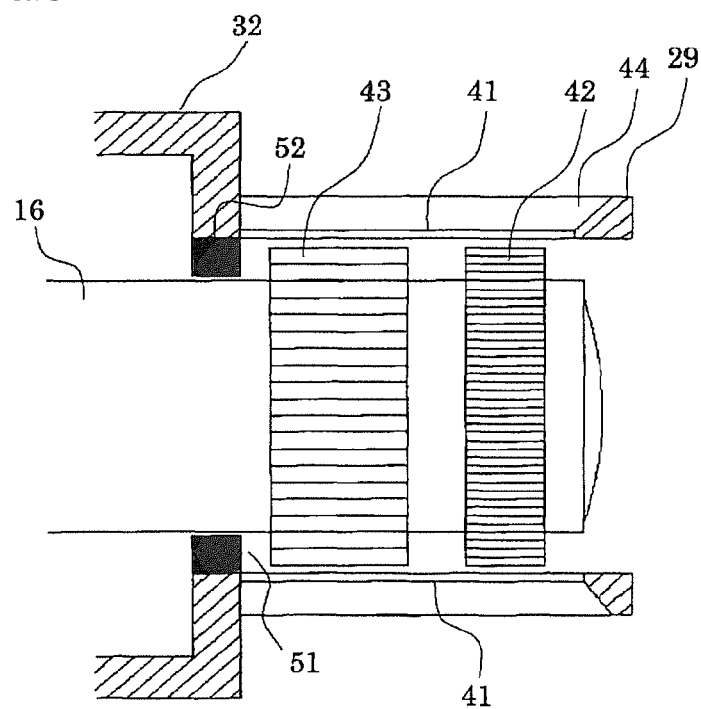
FIG. 5 is a lateral cross section of a lens hood in a third embodiment of the present invention.
Figure 6:
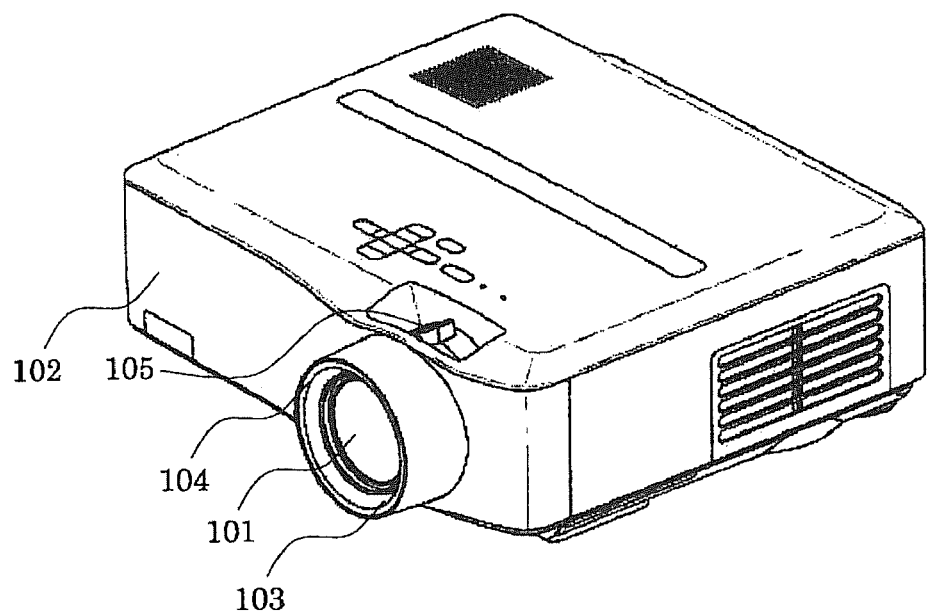
FIG. 6 is a perspective view of a first projector relating to the related art.
Figure 7:
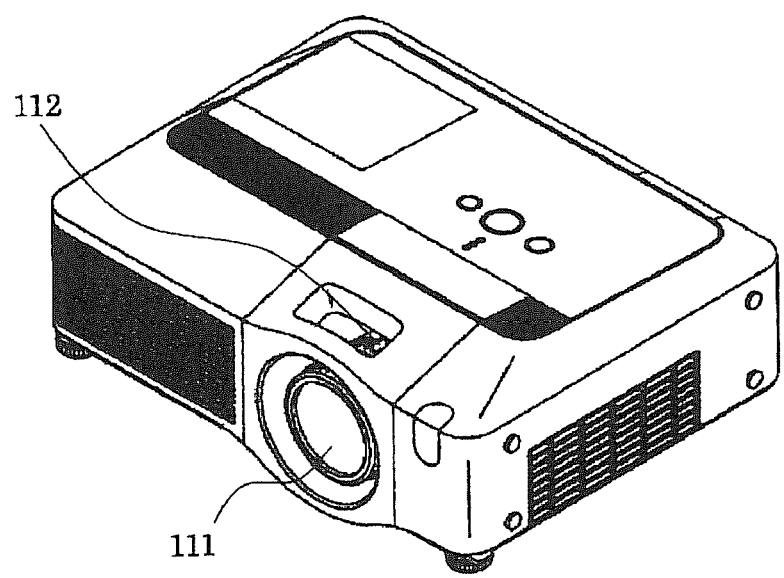
FIG. 7 is a perspective view of a second projector relating to the related art.

FIG. 5 is a lateral cross section of lens hood 29 of projector 21, as shown at a lateral side. The third embodiment, as compared with the second embodiment, provides front panel 32 having an opening 51 (a first opening) for the projection lens, that has a circumferential surface with urethane 52 (a dustproof member) attached thereto. This can close a gap formed between opening 51 for the projection lens and projection lens 16 and also prevent dust or the like foreign matters from entering through the gap otherwise formed between opening 51 for the projection lens and projection lens 16.

In the first embodiment opening 41 for the dial is provided at lens hood 29 through a top side and in the second embodiment opening 41 for the dial is provided at the lens hood through top and bottom sides. However, the present invention is not limited thereto, and the opening may be provided anywhere on the circumference of lens hood 29.

Furthermore, while the present embodiment has indicated a projection image display apparatus employing a liquid crystal display panel, the present invention is not limited thereto, and is also applicable to a projection image display apparatus including a different type of image light generation system, and can also be applied in the DLP (Digital Light Processing) system, a registered trademark of Texas Instruments Incorporated, and the LCOS (Liquid Crystal on Silicon) system.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A projection image display apparatus comprising:
    a projection lens;
    a front panel having a first opening for said projection lens, said projection lens projecting through said first opening;
    a lens hood covering said projection lens circumferentially, said lens hood having at least one second opening spaced from an end of said lens hood for a dial; and
    a lens dial located at a circumference of said projection lens and operated to adjust one of focusing and zooming, said lens dial being exposed through said at least one second opening.

2. The projection image display apparatus according to claim 1, wherein said at least one second opening is at least two openings.

3. The projection image display apparatus according to claim 1, further comprising a dustproof member between said first opening and said projection lens.

* * * * *